(12) United States Patent
Mohr et al.

(10) Patent No.: US 10,880,179 B2
(45) Date of Patent: Dec. 29, 2020

(54) METHOD FOR TOPOLOGY DETERMINATION IN A MOBILE COMMUNICATIONS SITE, A COMPUTER PROGRAM, A COMPUTER PROGRAM PRODUCT AND A CORRESPONDING MOBILE COMMUNICATIONS SITE

(71) Applicant: Telefonaktiebolaget LM Ericsson (publ), Stockholm (SE)

(72) Inventors: Markus Mohr, Rosenheim (DE); Johann Schmid, Riedering (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/272,490

(22) Filed: Feb. 11, 2019

(65) Prior Publication Data
US 2019/0253323 A1 Aug. 15, 2019

(30) Foreign Application Priority Data
Feb. 12, 2018 (DE) .......................... 10 2018 103 097

(51) Int. Cl.
*H04L 12/26* (2006.01)
*H04L 12/24* (2006.01)
(Continued)

(52) U.S. Cl.
CPC .............. *H04L 41/12* (2013.01); *H04L 41/14* (2013.01); *H04L 43/50* (2013.01); *H04Q 1/24* (2013.01);
(Continued)

(58) Field of Classification Search
None
See application file for complete search history.

(56) References Cited

U.S. PATENT DOCUMENTS

| 6,614,764 B1 | 9/2003 | Rodeheffer et al. |
| 8,976,704 B2 | 3/2015 | Morper |

(Continued)

FOREIGN PATENT DOCUMENTS

| EP | 2 033 379 A1 | 3/2009 |
| EP | 3 094 047 | 11/2016 |

OTHER PUBLICATIONS

European Search Report dated Mar. 22, 2019, issued in European Patent Application No. 19156293.3, 3 pages.

*Primary Examiner* — Brandon M Renner
(74) *Attorney, Agent, or Firm* — Sage Patent Group

(57) ABSTRACT

Method for topology determination in a mobile communications site, wherein the mobile communications site has n nodes each having m ports. In 'determining' ($S_1$), the number of existing nodes is determined. In 'designating', one of these nodes is designated as the master node and the others as slave nodes. In 'selecting', a slave node is selected as a test slave node and the communication of the other slave nodes is prevented. In 'testing', a test is performed to determine via which ports of the master node and via which ports of the test slave node a communication is possible. Thereafter, 'selecting' and 'testing' are repeated for the other slave nodes, wherein in the method step 'selecting', a different slave node is selected as the test slave node in each case. In the method step 'generating', a connection topology is then generated for the master node.

20 Claims, 12 Drawing Sheets

(51) Int. Cl.
  *H04W 40/24* (2009.01)
  *H04Q 1/24* (2006.01)
  *H04W 40/22* (2009.01)
  *H04W 84/20* (2009.01)

(52) U.S. Cl.
  CPC ......... *H04W 40/22* (2013.01); *H04W 40/246* (2013.01); *H04W 84/20* (2013.01)

(56) References Cited

U.S. PATENT DOCUMENTS

| | | | |
|---|---|---|---|
| 10,021,177 B1* | 7/2018 | Ridges | H04L 65/403 |
| 2005/0196124 A1 | 9/2005 | Aldereguia et al. | |
| 2005/0265356 A1 | 12/2005 | Kawarai et al. | |
| 2006/0120384 A1* | 6/2006 | Boutboul | H04L 45/00 370/400 |
| 2006/0265519 A1* | 11/2006 | Millet | H04L 12/42 709/251 |
| 2007/0291665 A1 | 12/2007 | Hauenstein et al. | |
| 2008/0168182 A1* | 7/2008 | Frank | G06F 1/12 709/248 |
| 2010/0257400 A1 | 10/2010 | Whitby-Strevens | |
| 2014/0040657 A1 | 2/2014 | Kiessling et al. | |
| 2015/0029868 A1 | 1/2015 | Mahasenan et al. | |
| 2015/0249587 A1 | 9/2015 | Kozat et al. | |
| 2016/0105320 A1* | 4/2016 | Osterberg | H04L 41/0846 709/208 |
| 2016/0337115 A1* | 11/2016 | Lu | H04J 3/0652 |
| 2017/0317813 A1* | 11/2017 | Shang | H04J 3/06 |
| 2019/0082313 A1* | 3/2019 | Kerselaers | H04W 52/383 |

\* cited by examiner

| Node | Rank no. | Rank |
|------|----------|------|
| 1 | 23 | 2 |
| 2 | 18 | 1 |
| 3 | 31 | 3 |

| Node | Rank no. | Rank |
|------|----------|------|
| 1 | 123 | 6 |
| 2 | 44 | 3 |
| 3 | 23 | 1 |
| 4 | 255 | 7 |
| 5 | 34 | 2 |
| 6 | 101 | 5 |
| 7 | 88 | 4 |

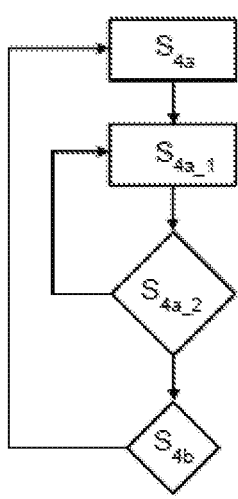 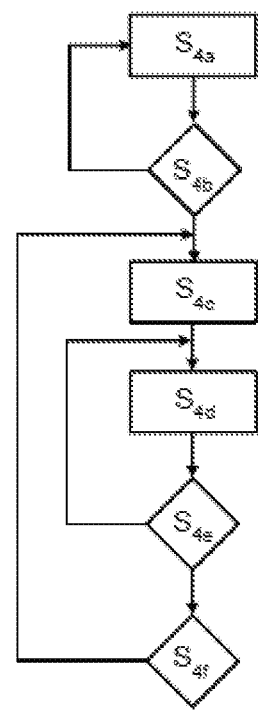
Fig 6D                                Fig 6E

METHOD FOR TOPOLOGY DETERMINATION IN A MOBILE COMMUNICATIONS SITE, A COMPUTER PROGRAM, A COMPUTER PROGRAM PRODUCT AND A CORRESPONDING MOBILE COMMUNICATIONS SITE

CROSS-REFERENCE TO RELATED APPLICATION

This application claims priority to DE 10 2018 103 097.5 filed Feb. 12, 2018, the entire contents of each of which is hereby incorporated by reference.

FIELD

The technology herein relates to a method for topology determination in a mobile communications site and a corresponding mobile communications site. Furthermore, a computer program having program code means and computer program products are also specified to enable one to execute the steps of the method.

BACKGROUND & SUMMARY

Currently used mobile communication sites comprise an antenna arrangement, which is supplied with energy and mobile communications signals by a base station. In most cases, the antenna arrangement is thereby mounted on an antenna mast to allow one to provide a certain territory with mobile communication services. The base station is often arranged on the ground and connected to the antenna arrangement via a corresponding feeder cable. Such an antenna arrangement also comprises additional components, which can be controlled by the mobile communications site operator. For example, the down-tilt angle of the antenna arrangement can be adapted to the respective requirements during normal operation to be able to optimally adjust the cell size. It is also possible that an amplifier, particularly in the form of a tower-mounted amplifier (e.g., single-band dual tower-mounted amplifier—SB-DTMA; dual-band dual tower-mounted amplifier—DB-DTMA), is actuated by the operator, for example turning it on or off. The control signals required for this may be transmitted to the base station and be forwarded by the base station to devices to be controlled on the antenna mast. To keep the number of feeder cables low, various mobile communications bands or signal paths (e.g., MIMO paths) are transmitted over the same feeder cable, wherein in each case one feeder cable is used for each of the two polarisations (MAIN signal; DIV signal) or N×M MIMO (e.g., for LTE (-A)). To separate and recombine the respective mobile communications bands, corresponding filters are necessary, which are also referred to as combiners. Such filters typically have a plurality of signal terminals for the different mobile communications bands and a common terminal for the feeder cable. Band-pass structures within the combiner ensure that the mobile communications bands, which contact the common terminal, are only emitted at one signal terminal.

Due to the many different components and the varying number of mobile communications bands, over which the mobile communications signals of different mobile communications standards can be transmitted, a plurality of components are necessary that must be interconnected in a correct sequence. The individual mobile communications sites may also differ significantly from each other. Consequently, mistakes can occur when interconnecting the individual components. In this case, the constructed mobile communications site will deviate from the planned mobile communications site in terms of its connections between the individual electrical functional units.

It is therefore desirable that one is able to check in the simplest manner possible the proper interconnection of the individual electrical functional units, both locally as well as remotely.

Solutions from prior art are known for remote technical regions for finding out in general whether a component is connected to precisely one other component. Such a solution is known from US 2005/0196124 A1. Its subject matter describes the ability of adding additional hardware components to already existing circuit boards and/or housings to increase the memory in mass storage devices, for example. For example, it describes that the connection between two systems is verified to the effect that a first system sends out a signal, and a second system identifies a connection port at which this signal was received and notifies the first system about this. A disadvantage of US 2005/0196124 A1 is that this solution is not suitable for transfer to a mobile communications site because here the wiring between the individual systems can be arbitrary and a single system may be connected to a plurality of other systems.

Therefore, the present example embodiment provides a method for determining the topology in a mobile communications site, by means of which the circuitry of the individual electrical functional units within the mobile communications site can be identified.

The technology herein provides methods according to the example embodiment for topology determination in the mobile communications site, developments of the method according to the example embodiment, a computer program having program code to allow one to execute the method according to the example embodiment when the program is executed on a computer or a digital signal processor. The present technology also provides a computer program product having in particular program code stored on a machine-readable carrier to allow one to execute all steps pursuant to the method according to the example embodiment, when the program is executed on a computer or a digital signal processor. The present technology also provides a mobile communications site, which is designed to execute the topology determination method.

The method according to the example embodiment for topology determination in a mobile communications site provides that the mobile communications site comprises n nodes where n≥2, n≥3, n≥4, n≥5, n≥6, n≥7, n≥8 or n≥9, wherein each node represents an electrical functional unit. Furthermore, each node has m ports, where m≥1. Each of the n nodes is electrically and/or electromagnetically connected for communications purposes via at least one of its m ports to at least one other of the n nodes via at least one of its m ports. This connection is wired in particular, wherein preferably the cable that is used for interconnecting the respective nodes is also the cable via which, in normal operation of the mobile communications site, the mobile communications bands, in other words the HF signals, are transmitted. An electromagnetic connection may also comprise a fibre optic cable connection.

The method can be carried out in particular when the mobile communications site is not in a regular operating mode. Basically, the method according to the example embodiment comprises the following method steps. In a first method step, the number of existing nodes is determined to then in a subsequent method step designate one of these nodes as the master node and the other (n−1) nodes as slave nodes. Thereupon, one of these slave nodes is selected as a test slave node and the other (n−2) slave nodes are actuated in such a manner that communication is prevented (temporarily) on their ports. This preferably means that they can receive communications signals on their ports, but they no longer respond to these signals and also no longer forward them. In an additional method step, a check is performed to determine via which of the m ports of the master node and via which of the m ports of the test slave node communication between the master node and the test slave node is possible. The ports, via which a communication between the master node and the test slave node can occur, are then stored (e.g. in a memory unit). In the simplest case, a "communication" refers simply to an electrical or electromagnetic connection. In the following, the mentioned steps are repeated for the other slave nodes, of which one each (only one at a time) is successively selected as the test slave node. To select a different slave node as the new test slave node, communication of the individual nodes can optionally (briefly) be permitted again. In this case, as soon as a new test slave node is selected, communication of the other slave nodes and the earlier master nodes is preferably prevented again. Lastly, a connection topology can be generated for the one master node, from which one can see with which other (slave) nodes the master node can communicate directly (in other words, without an intermediate connection of an additional node).

It is particularly advantageous that one can determine a topology in a mobile communications site using the method according to the example embodiment and that this method is also suitable particularly when the individual electrical functional units (nodes) have a plurality of ports and can be connected to many other nodes, by means of which a complex topology results. The method according to the example embodiment can also be used with the already existing wiring of the mobile communications site. No separate cable connections are necessary for the data exchange of the individual results.

In a development according to the example embodiment, the already described method steps, which resulted in generating a connection topology for the master nodes, are repeated, wherein one of the earlier slave nodes (which naturally also include the test slave node) is designated as the new master node. Consequently, a connection topology is also generated for this new master node. This is continued until at least n−1 nodes have been designated once as master nodes. For the last slave node, which was not designated as a master node, its connection topology can be determined from the already generated connection topologies of the n−1 master nodes. For the corresponding repetitions, the prior master nodes do not have to be taken into account (a node once designated as a master node is not required to be designated again as a slave node or test slave node). A connection from a new master node to a prior master node is already known.

It is also possible that, in addition to its m ports, at least one of the n nodes still has at least one additional wired or wireless interface, and is designed to communicate over this at least one additional interface with additional networks or devices. Such an additional interface is added when assembling the connection topology. This additional interface may involve for example a LAN interface (IEEE 802.3*), or a WLAN interface (IEEE 802.11*) or a Bluetooth® interface (IEEE 802.15.*), which also includes Bluetooth Low Energy, or a ZigBee® interface (IEEE 802.15.4), or a Z-Wave® interface, or an IPv6-based THREAD® interface.

In an additional embodiment of the method according to the example embodiment, a (complete) topology of the mobile communications site is generated using the already determined connection topologies of the individual nodes. This (complete) topology of the mobile communications site indicates to which other node or nodes each node is connected (preferably for data exchange purposes). This (complete) topology can be determined by a node or by a control device to which the individual connection topologies are transmitted. Preferably, the (complete) topology also contains information about what type of interface and optionally which protocol is used to allow a corresponding communication between two nodes. Basically it is possible that the generated topology is compared with a reference topology, wherein deviations point to incorrect wiring and can be transmitted, for example, via a communications device to a higher-level routing or control device. Such deviations may also be outputted on site to a computer system of an installer, for example (e.g. smartphone, laptop).

In a development of the method according to the example embodiment, the master node is designated based on its rank. Basically, it is possible here to assign an individual rank to each determined node. In doing so, no rank is assigned twice. The node whose rank has, for example, the lowest or highest value compared to the other nodes is then designated as the master node or as a respective new master node. A random selection would also be possible. These ranks can be retained for the period in which the method according to the example embodiment is executed, or entirely or partially new ranks can be assigned. Such a new allocation occurs in particular when the connection topology for a master node is determined. The rank of a node can result for example from a serial number, the device type, the number of ports, the MAC address, the IP address, an arbitrary address, a number, a random number, a device feature and/or a temperature value or a feature derived therefrom, such as a HASH value.

As already described, communication of the other slave nodes is prevented during an analysis regarding between which ports a communication between the master node and the test slave node is possible. This can occur for a specified period, which is identical or different for each of the other slave nodes and may result from the rank, if applicable. Communication can also be prevented until a corresponding trigger signal is received (e.g. infrared trigger, radio trigger, and so on). Prevention occurs preferably by an interruption in layer 1. An interruption in a higher layer would also be conceivable.

In a development of the method according to the example embodiment, it is determined whether a communication can be created via (only) one of the m ports of the master node to the test slave node. If this succeeds, then this port is stored for the master node. This method step is then repeated for all ports of the master node. For this verification, only one port of the master node would be active (at the same time) or the communication would only take place via one port simultaneously. Basically, given that a communication has taken place, it would then be possible for the test slave node to activate or deactivate its ports in an iterative manner, so that either the master node or the test slave node can determine via which ports of the test slave node a communication can take place with the master node. This iterating of the terminal port on the test slave node can be initiated for example by the master node or automatically (e.g. by the passage of time) by the test slave node. Here it is also determined in particular what type of interface and optionally what protocol is used for a corresponding communication between these ports of both nodes to be possible.

In regard to the nodes, these involve in particular base stations, combiners, DTMAs, RET units, antenna arrangements, monitoring units, and other (future) devices. Preferably, at least two different units of the ones listed are used in a present-day mobile communications site. In this way, it would be possible for the method according to the example embodiment to be applied to four combiners, wherein at least one (dual-band) DTMA is also present. Therefore, all in all, one or preferably two different types of functional units are utilised.

The mobile communications site according to the example embodiment has n nodes where n≥2 or n≥3, wherein each node comprises m ports, where m≥1. The mobile communications site is then designed to execute the method for topology determination.

BRIEF DESCRIPTION OF THE DRAWINGS

Various embodiments of the example embodiment are described hereinafter by way of example with reference to the drawings for illustrative purposes. The same subjects have the same reference signs. In the drawings in detail:

FIG. 6A, 6B, 6C, 6D, 6E: show various flowcharts that explain how a method according to the example embodiment for determining topology operates in a mobile communications site.

DETAILED DESCRIPTION OF EXAMPLE EMBODIMENTS

Figure 1:
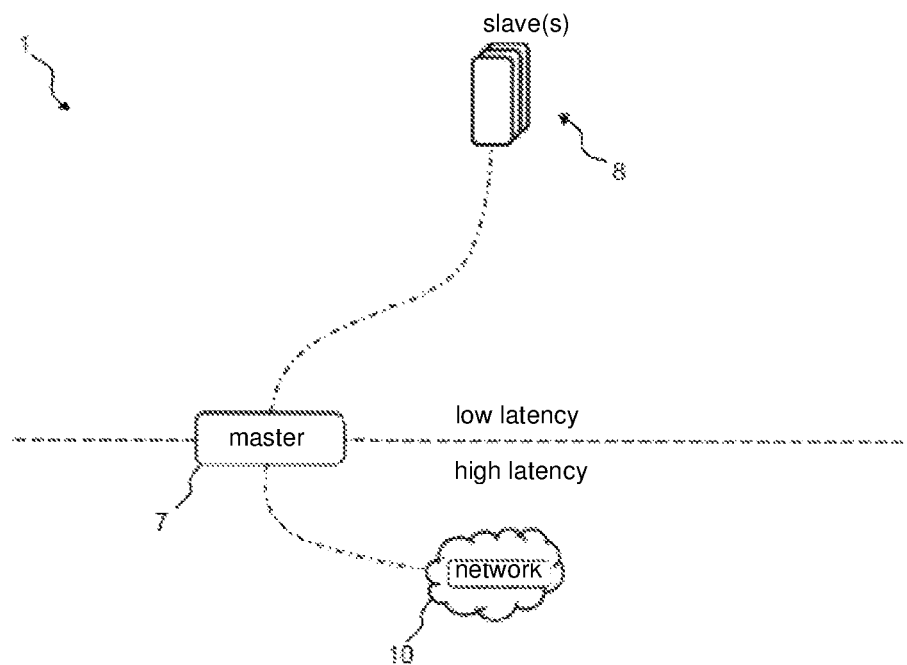
FIG. 1, 2A, 2B: show a basic functioning mode of a mobile communications site.
Figures 2A, 2B:
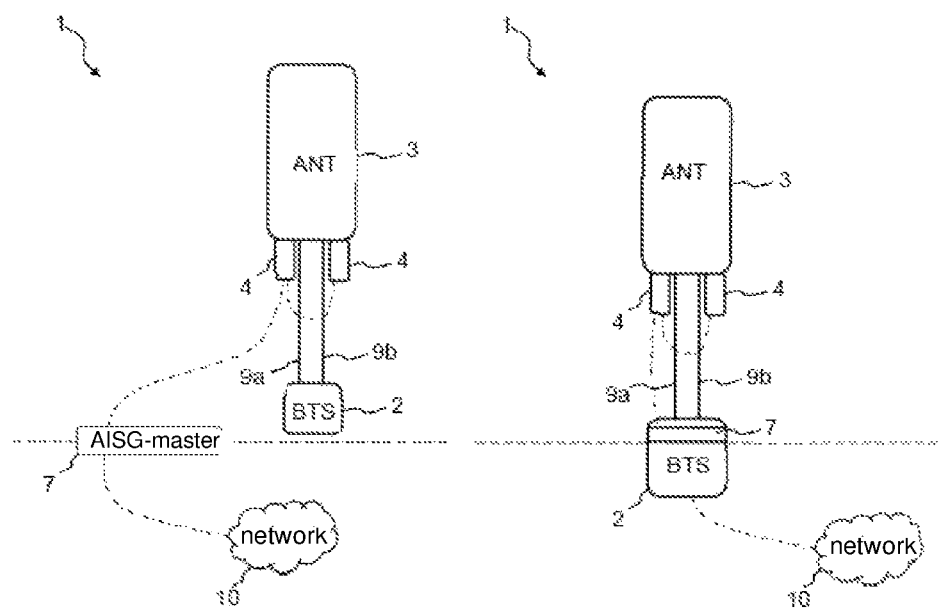

FIGS. 1, 2A and 2B depict the basic functioning or the basic setup of a mobile communications site 1. A mobile communications site 1 comprises one or a plurality of base stations 2, which receives in particular data from a higher-level network 10 and transmits data thereto. The base station 2 prepares this data and allocates it to the respective mobile communications bands. Furthermore, an additional antenna arrangement 3 is provided, which comprises preferably a plurality of antenna elements, which are used to transmit and receive mobile communications signals in different mobile communications bands. In this example, the mobile communications site 1 also comprises two RET units 4. Via the RET unit 4, it is possible to actuate a phase shifter, which is arranged within the antenna arrangement 3. In this way, the down-tilt angle of the antenna arrangement 3 can be changed, by which different spatial regions are illuminated by the mobile communications site 1. A DTMA 5 (see FIG. 3C) could also be appropriate. As will be explained later in regard to FIGS. 3A, 3B, 5A and 5B, the mobile communications site 1 also comprises a plurality of combiners 6. The mobile communications site 1 may also comprise general monitoring units, by means of which temperature, air pressure, air humidity, wind speed, solar radiation and/or the orientation of the antenna arrangement 3 may be measured. A monitoring unit may also comprise a webcam to monitor the location of the mobile communications site 1. These components of the mobile communications site 1 are hereinafter also referred to as electrical functional units. These electrical functional units can be actuated via certain control commands (e.g. AISG commands). An AISG master 7 generates these control commands and transmits them to the AISG slaves. AISG slaves 8 may be those units, which were previously described as electrical functional units. Due to the length of time it takes until new devices are included in the AISG standard, currently not all desired devices can be actuated by the AISG master 7. Therefore, the electrical functional units also comprise devices, which are not to be counted as AISG slaves 8. The control commands are in this case usually transmitted via the same feeder cable 9a, 9b, over which the mobile communications signals are also transmitted. However, other frequency ranges are used in this case. The AISG signal is transmitted on a lower frequency of 2,176 Hz, for example. This frequency lies below the frequencies that are used for mobile communications services. The AISG signal is an on/off keying signal, wherein the on-signal has a signal level of +5 dBm, and wherein the off-level comprises a signal level of −40 dBm. Data rates of at least 9.6 kbit/s are possible. The AISG standard thereby provides that the communication between the AISG master 7 and the AISG slaves 8 may only have a low latency. In contrast, it is different for communication between the AISG master 7 and a higher-level network 10 (e.g. routing or control device of the mobile communications operator). Such a connection, as can also occur via the Internet, has a higher latency.

In FIG. 2A, the AISG master 7 is arranged separately from the at least one base station 2 (e.g. as separate hardware). The base station 2 is connected to the antenna arrangement 3 via two feeder cables 9a, 9b. Different polarisations (MAIN signal and DIV signal) of a mobile communications channel are transmitted via different feeder cables 9a, 9b, for example. The same may also apply for the MIMO paths.

In contrast, in FIG. 2B the AISG master 7 is integrated directly in the base station 2, in particular as a software module.

Figure 3A:
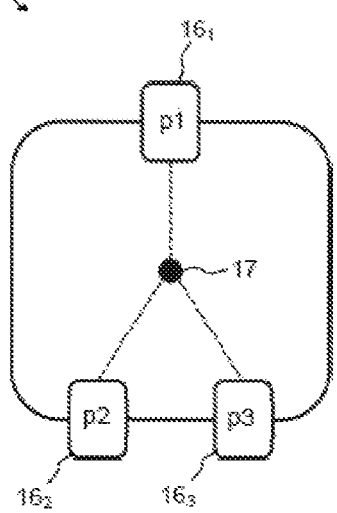
FIG. 3A, 3B, 3C, 3D: show various embodiments of a node having a varying number of ports.
Figure 3B:
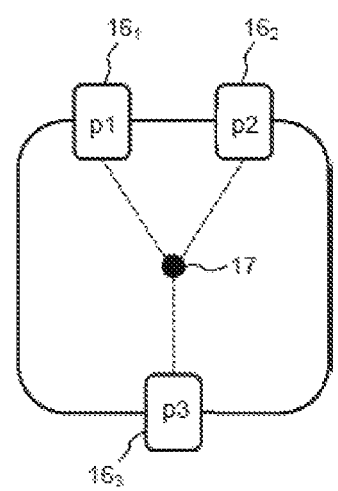
Figure 3C:
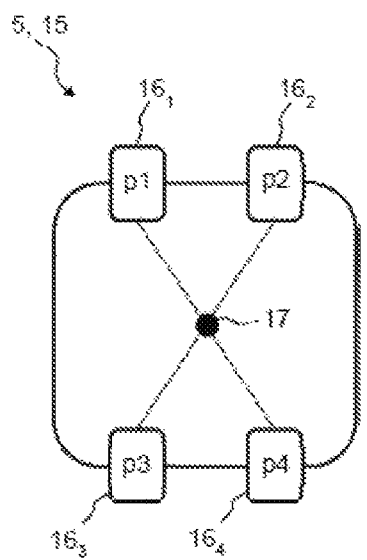
Figure 3D:
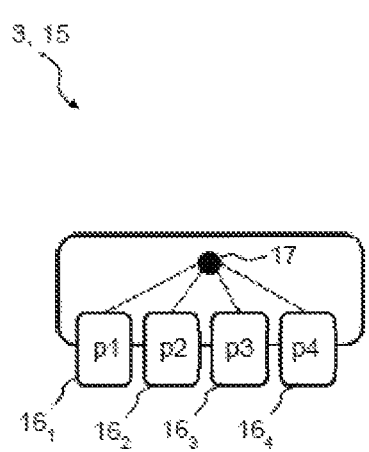

FIGS. 3A, 3B, 3C and 3D depict various embodiments of electrical functional units. Those electrical functional units, which can be connected to other electrical functional units and that can exchange data via other electrical functional units or with other electrical functional units, are also referred to as nodes. The mobile communications site 1 comprises at least n nodes $15_1, \ldots, 15_n$ where n≥2, or n≥3. FIG. 3A shows such a node 15 in the form of a combiner 6, 6a. The depicted combiner 6, 6a is connected at the lower end of the antenna mast to the base stations 2. This is therefore a base station-side combiner 6, 6a. In contrast, FIG. 3B depicts a node 15 in the form of an additional combiner 6, 6b, which is mounted on the antenna mast in the vicinity of the antenna arrangement 3 and is connected thereto. This is an antenna-side combiner 6, 6b. The node 15 from FIG. 3C is a (single-band or dual-band) DTMA 5. The node 15 from FIG. 3D is the antenna arrangement 3. The RET unit 4 may also be arranged therein. Each node 15; $15_1, \ldots, 15_n$ comprises m ports $16_1, \ldots, 16_m$ where m≥1. A port $16_1, \ldots, 16_m$ is also to be understood as being a terminal, wherein the communication preferably occurs in both directions (full-duplex or half-duplex, if applicable). Via this port $16_1, \ldots, 16_m$, node $15_1, \ldots, 15_n$ can be connected to port $16_1, \ldots, 16_m$ of another node $15_1, \ldots, 15_n$. To this end, a cable (e.g. a copper cable) is used, which can also include a respective feeder cable 9a, 9b.

Both mobile communications signals and control commands (e.g. in the form of AISG signals) and/or a direct voltage to supply power to the antenna arrangement 3 can be transmitted via the individual ports $16_1, \ldots, 16_m$.

In particular, there are nodes $15_1, \ldots, 15_n$, which function as end nodes. These include for example the antenna arrangement 3 from FIG. 3D or the base station 2. No additional nodes are connected to such an end node to enlarge the mobile communications site 1. However, there are also transit nodes, which receive signals and/or voltages at one or more ports $16_1, \ldots, 16_m$ to output these again to another port $16_1, \ldots, 16_m$ and provide them to another node $15_1, \ldots, 15_n$. Such transit nodes are depicted in FIGS. 3A, 3B and 3C. These involve in particular combiners 6 and DTMAs 5.

A combiner 6 comprises a plurality of signal terminals, to which are supplied or which receive different mobile communications bands, and a common terminal, from which different mobile communications bands are outputted in a superimposed manner or received in a superimposed manner by the different mobile communications bands. In FIG. 3A, the common terminal is port $16_1$ and the signal terminals are ports $16_2, 16_3$. In FIG. 3B, the common terminal is port $16_3$ and the signal terminals are ports $16_1, 16_2$. The combiners 6 thereby preferably have a cavity design. Corresponding filter paths connect the common terminal to the signal terminals, wherein the filter paths act as band-pass filters and preferably let only one mobile communications band pass through in each case. Low-frequency signals (e.g. control signals, such as AISG signals) and direct voltages cannot be transmitted via the filter paths. Therefore, these are decoupled at the signal terminals via low-pass filters and are preferably routed via a separate circuit board to couple these in again at the common terminal (or vice versa).

Nodes $15_1, \ldots, 15_n$ also comprise a control device 17. This control device 17 may be a microcontroller or FPGA, for example. This control device 17 is designed to prevent a communications link via the individual ports $16_1, \ldots, 16_m$. Such a communications link involves communications signals (in particular low-frequency signals, but for example also those that lie between individual mobile communications bands or are also multiplexed (e.g. code-, ... )), in other words preferably not the mobile communications signals themselves. In particular, a communications link, which is decoupled via a filter structure, can be prevented by the control device 17. Preferably, the combiners 6 and/or DTMAs 5 are designed in such a manner that a direct voltage, which is added at a port $16_1, \ldots, 16_m$, can also be outputted at at least one other port $16_1, \ldots, 16_m$. Control signals (e.g. AISG signals) or other communications signals, which are used for communication among the electrical functional units and are not mobile communications signals, may also be transmitted from one port $16_1, \ldots, 16_m$ to another port $16_1, \ldots, 16_m$ (in particular in a bidirectional manner). Preferably there is in this transmission path within the combiner 6 or the DTMA 5 a switch device, which can interrupt this transmission on layer 1. Preferably the direct voltage supply is not affected hereby. For this reason, the combiner 6 or the DTMA 5 comprises for example an additional crossover, which separates a direct voltage from a control signal (communications signal, such as AISG signal). Basically, it would also be possible for control signals, which are present at a port $16_1, \ldots, 16_m$, to be captured by the control device 17 and outputted to another port $16_1, \ldots, 16_m$. In this case, an interruption could occur at a higher protocol level (higher layer).

FIGS. 4A, 4B, 4C and 4D explain by means of a simple embodiment how a topology in a mobile communications site 1 can be determined according to the example embodiment. For explanation purposes, in this context reference is made to the flowcharts of FIGS. 6A and 6B.

Figures 4A, 4B:
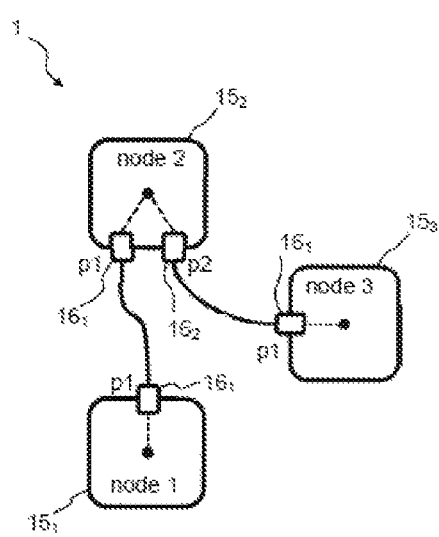
FIG. 4A: shows an embodiment for determining the rank of a node.
FIG. 4B, 4C, 4D: show an embodiment that indicates how the topology can be determined from FIG. 4A.

The illustrative, highly simplified mobile communications site 1 is set up according to FIG. 4B. It comprises three nodes $15_1, 15_2$ and $15_3$. Node $15_1$ comprises a port $16_1$, whereas node $15_2$ comprises two ports $16_1, 16_2$, and wherein node $15_3$ has one port $16_1$.

In this embodiment, the first port $16_1$ of the first node $15_1$ is electrically connected to the first port $16_1$ of the second node $15_2$. Furthermore, the first port $16_1$ of the third node $15_3$ is electrically connected to the second port $16_2$ of the second node $15_2$.

In a first method step $S_1$, the number of existing nodes $15_1, 15_2$ and $15_3$ that can communicate with each other is determined. This can take place for example by the respective control devices 17 transmitting their presence within a node $15_1, \ldots, 15_n$ sequentially within the scope of a communications signal (e.g. broadcast to all of their ports $16_1, \ldots, 16_m$), wherein this communications signal may also contain information about the type, the number of ports $16_1, \ldots, 16_m$ and/or an individual rank. Preferably, the structure of the nodes $15_1, \ldots, 15_n$ is selected in such a manner that no ring closure occurs. This is also not desired in the structure of a traditional mobile communications site 1, because in this case the communications signals are simply transmitted from the base stations 2 towards the antenna arrangement 3 and from the antenna arrangement 3 towards the base stations 2. It would also be possible that the number of nodes $15_1, \ldots, 15_n$ is specified. It could then simply be verified for example whether these are interconnected as desired.

The information about the number of existing nodes $15_1, \ldots, 15_n$ is thereby stored by a higher-level control unit (not depicted) or by control device 17 of a node $15_1, \ldots, 15_n$. In this method step $S_1$, an individual rank can be assigned to each node $15_1, \ldots, 15_n$. Such an allocation is depicted for example in FIG. 4A. The first node $15_1$ has the rank of "2", the second node $15_2$ has the rank of "1" and the third node $15_3$ has the rank of "3". This rank of each node $15_1, \ldots, 15_n$ may result from individual features or can be derived from individual features. In this case, the rank stems from the individual rank number, which in this case corresponds to the serial number. For example, the second node $15_2$ has a serial number "18", which compared to the other serial numbers "23" and "31" represents the lowest number in this case, and accordingly results in the lowest rank. How the rank is determined is arbitrary, however. The only important consideration is that each node $15_1, \ldots, 15_n$ has an individual rank, which is not used by any other node $15_1, \ldots, 15_n$.

In a second method step $S_2$, one of the identified n nodes $15_1, \ldots, 15_n$ is designated as the master node and the other n−1 nodes $15_1, \ldots, 15_n$ are designated as slave nodes $15_1, \ldots, 15_n$. In the embodiment, the node $15_1, \ldots, 15_n$ with the lowest rank is designated as the master node. In this case, this is the second node $15_2$.

In a third method step $S_3$, a slave node $15_1, \ldots, 15_n$ is selected as a test slave node. The test slave node may for example be node $15_1, \ldots, 15_n$, which has the next lowest rank compared to the master node. In this case for the test slave node, this is the first node $15_1$. Furthermore, a communication of the other n−2 slave nodes is (temporarily) prevented. In this case (only three nodes $15_1, \ldots, 15_3$ are depicted), only communication at the third node $15_3$ is prevented. This prevention may occur at all ports $16_1, \ldots, 16_m$ of the slave nodes. Prevention may take place for a predetermined period or until a trigger signal is received by the corresponding slave nodes.

A fourth method step $S_4$ verifies via which of the m ports $16_1, \ldots, 16_m$ of the master node, in other words the second node $15_2$, and via which of the m ports $16_1, \ldots, 16_m$ of the test slave node, in other words the first node $15_1$, a communication between the master node and the test slave node is possible. Corresponding ports $16_1, \ldots, 16_m$ of the master node and test slave node are stored accordingly.

Thereupon, the fifth method step $S_5$ is executed. In this method step, the third and fourth method steps $S_3$, $S_4$ are executed for every additional slave node, wherein in the third method step $S_3$, in each case a different slave node is selected as the test slave node. Therefore, in the embodiment from FIG. 4B, the third node $15_3$ is selected as the new test slave node. Subsequently, whether a communication can be created is verified and, if so, via which ports $16_1, \ldots, 16_m$ of the master node, in other words of the second node $15_2$, and the new test slave node, in other words the third node $15_3$. Corresponding ports $16_1, \ldots, 16_m$ are stored for the master node as well as for the new test slave node.

Thereafter, the sixth method step $S_6$ can be executed. In this method step, a connection topology is generated for the master node, in this case for the second node $15_2$.

The seventh method step $S_7$ is executed below according to FIG. 6B. In this method step $S_7$, the second, third, fourth, fifth and sixth method steps $S_2$ to $S_6$ are repeated. However, in the second method step $S_2$ a different node $15_1, \ldots, 15_n$ is designated as the (new) master node. This other node $15_1, \ldots, 15_n$ is one of the earlier slave nodes, which can also include the earlier test slave node. The other nodes $15_2, \ldots, 15_n$, except for the old master node, are in turn designated as slave nodes. These slave nodes, which can also include the prior test slave node, are alternately (every time when method step $S_5$ is executed) designated as the new test slave node. Now, a corresponding connection topology is generated for the new master node. The seventh method step $S_7$ is thereby executed until at least n–1 nodes $15_1, \ldots, 15_n$ have functioned once as a master node. The connection topology for last node $15_n$ may be generated using the already determined connection topologies for the previous master nodes.

Figure 4C:
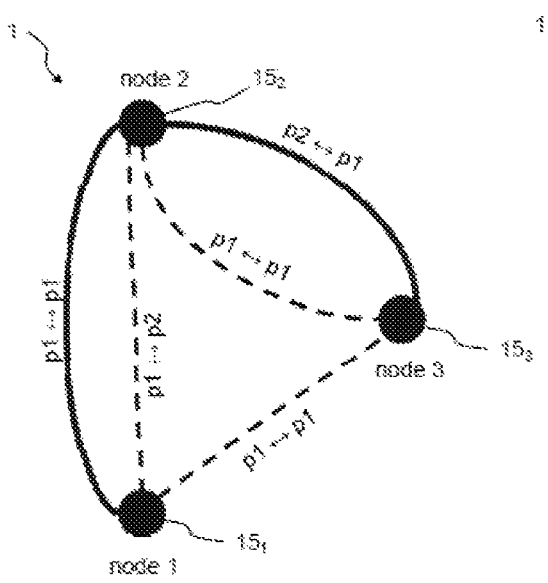
Figure 4D:
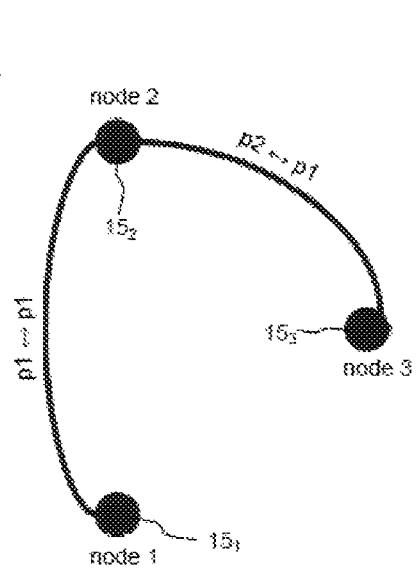

A corresponding connection topology for the first, second, and third nodes $15_1$, $15_2$ and $15_3$ can be seen in FIG. 4C. A solid line depicts the connections between the respective ports $16_1, \ldots, 16_m$ of the respective nodes $15_1, \ldots, 15_3$ via which a communications link was successful. The dashed lines symbolise that a communications link between indicated ports $16_1, \ldots, 16_m$ of the respective nodes $15_1, \ldots, 15_3$ was not possible. FIG. 4D depicts an adjusted topology, wherein the unsuccessful communications links are not depicted.

The manner in which it is determined whether a communication between two ports $16_1, \ldots, 16_m$ of two different nodes $15_1, \ldots, 15_n$ is possible can be arbitrary. To this end, the AISG protocol or any other protocol (IP, SPI, I²C, and so on) may be used. In the simplest case, a low-frequency alternating voltage is modulated onto the line. Preferably, the communications link is low-frequency so that it can be interrupted or filtered out reliably by those nodes $15_1, \ldots, 15_n$ at their respective ports $16_1, \ldots, 16_m$ said nodes not being selected as master nodes or test slave nodes.

Basically, the assigned ranks of the individual nodes $15_1, \ldots, 15_n$ can be retained in the seventh method step $S_7$. It is also possible that the previous slave nodes, which also include the test slave node, have new ranks assigned to them.

After the seventh method step $S_7$, the eighth method $S_8$ is carried out. In this method step $S_8$, a (complete) topology of the mobile communications site 1 is generated. To this end, the individual connection topologies for respective nodes $15_1, \ldots, 15_n$ are used and combined. From this FIGS. 4C and 4D are obtained.

FIGS. 5A, 5B, 5C, 5D and 5E depict a detailed embodiment of an illustrative mobile communications site 1 and explain how its topology can be determined. In this case also, method steps $S_1$ to $S_8$ are executed as was already explained in regard to FIG. 4A to 4D. The depicted electrical functional units are explained in greater detail in FIG. 3A to 3D.

Figure 5A:
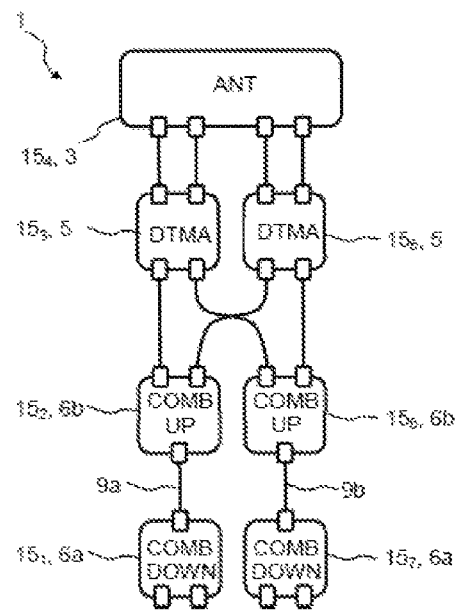
FIG. 5A, 5B, 5C, 5D, 5E: show an additional embodiment that indicates how a topology can be determined.
Figure 5B:
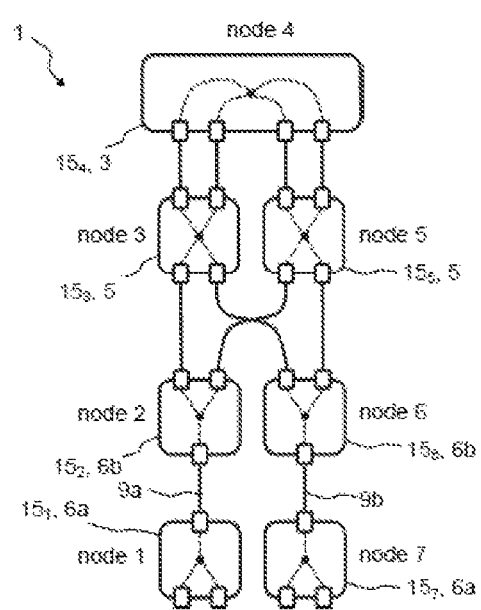

With reference to FIGS. 5A and 5B, it is shown that the mobile communications site there has seven nodes $15_1$, $15_2$, $15_3$, $15_4$, $15_5$, $15_6$ and $15_7$ (n=7). The first and seventh nodes $15_1$, $15_7$ are base station-side combiners 6, 6a, as described in FIG. 3A. At the signal terminals of each of these combiners 6, 6a, various base stations 2 are connected. The base station-side combiners 6, 6a are connected to the antenna-side combiners 6, 6b electrically via the feeder cables 9a, 9b, as was described in FIG. 3B. The antenna-side combiners 6, 6b are the second and sixth nodes $15_2$, $15_6$.

The antenna-side combiners 6, 6b are connected to corresponding single-band DTMAs 5 as was described in FIG. 3C. In this case, a first single-band DTMA 5 is third node $15_3$, whereas a second single-band DTMA is fifth node $15_5$. According to FIG. 5B, second node $15_2$ is connected both to third node $15_3$ as well as to fifth node $15_5$. Sixth node $15_6$ is also connected to third node $15_3$ and fifth node $15_5$. Third and fifth nodes $15_3$, $15_5$ are connected to fourth node $15_4$, which is an end node in the form of the antenna arrangement 3, as was described in FIG. 3D.

This antenna arrangement 3 may contain the RET unit 4 and/or various monitoring units, for example.

Figures 5C, 5D:
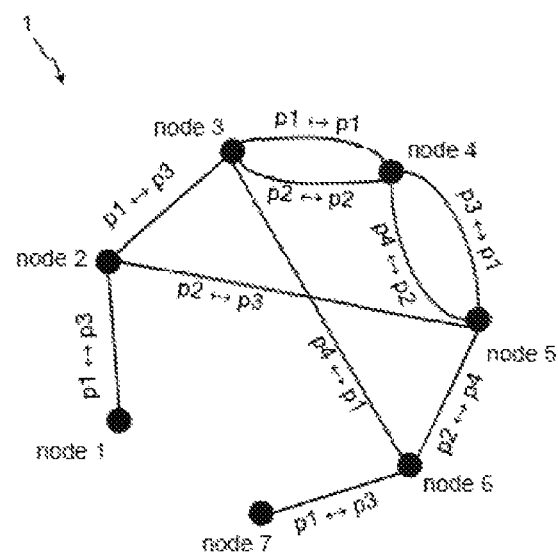

In the first method step $S_1$, the existing nodes $15_1$ to $15_7$ are determined, wherein a rank list is generated simultaneously. In the embodiment, third node $15_3$ has the lowest rank and fourth node $15_4$ has the highest rank. In this case, third node $15_3$ could be designated as the master node in the second method step $S_2$. After method steps $S_1$ to $S_6$ have been performed, the connection topology for the master node is obtained. Thereafter, the seventh method step $S_7$ is performed at least five times, wherein after this, the connection topology is obtained for n–1 nodes $15_1, \ldots, 15_{n-1}$. The connection topology for nth node $15n$ can be determined from the other connection topologies. Thereafter, the eighth method step $S_8$ is executed and the (complete) topology of mobile communications site 1 is determined as shown in FIG. 5D.

Figure 5E:
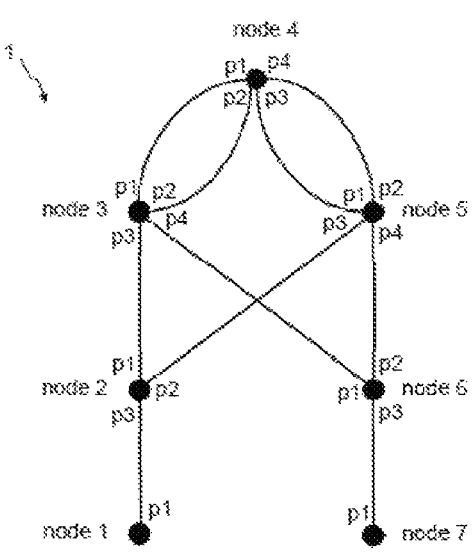

The solid line indicates via which ports $16_1, \ldots, 16_m$ the respective nodes $15_1, \ldots, 15_n$ are connected to each other. FIG. 5E depicts another view of FIG. 5D, wherein individual nodes $15_1, \ldots, 15_n$ are arranged according to the structure from FIG. 5B.

FIG. 6A to 6E depict various flowcharts, which explain the method according to the example embodiment for topology determination in greater detail. The flow chart sequences in FIGS. 6A and 6B have already been described.

Figure 6A:
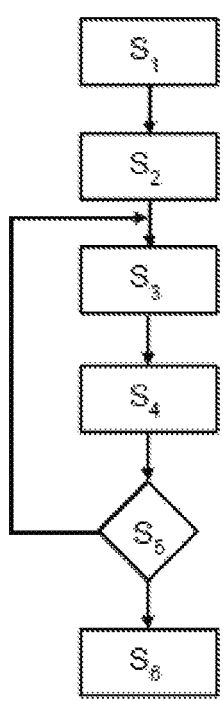
Figure 6B:
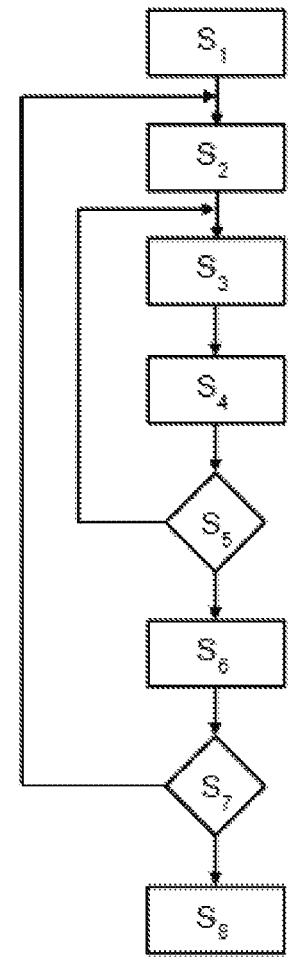
Figure 6C:
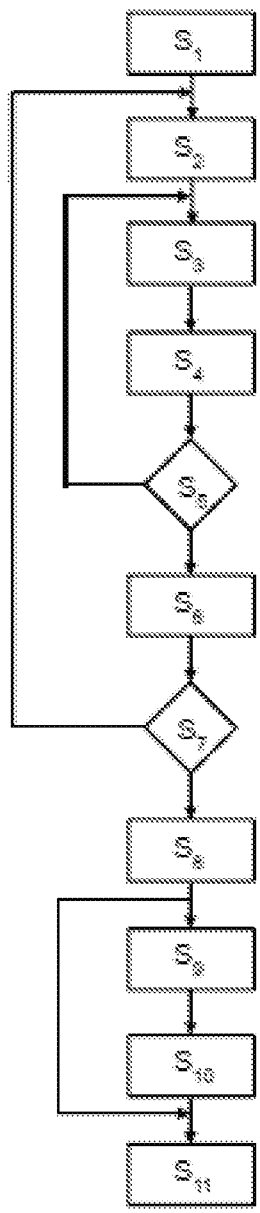

FIG. 6C depicts an expanded flowchart of the method from FIGS. 6A and 6B. The flowchart in FIG. 6C comprises the additional method steps $S_9$, $S_{10}$ and $S_{11}$. In the optional ninth method step $S_9$, the generated (complete) topology is compared with a reference topology. This can be done by one of the nodes $15_1, \ldots, 15_n$ or by a non-depicted control device.

In a subsequent tenth method step $S_{10}$, deviations between the generated (complete) topology and the reference topology are determined or outputted.

In an eleventh method step $S_{11}$, the generated (complete) topology of the mobile communications site 1 is transmitted to the higher-level routing and control device. Here it would also be possible for the detected deviations to be transmitted to the higher-level routing and control device. This can occur via a communications device, such as a hub, switch, router, gateway and/or modem. The method can also be started from the higher-level routing and control device via this communications device. Basically, the method can also be started directly from a computer (e.g. laptop) or a smartphone directly at the mobile communications site 1.

FIGS. 6D and 6E show an embodiment in greater detail to explain how the fourth method step $S_4$ could be designed more precisely. In the fourth method step $S_4$, it is verified via which of them ports $16_1, \ldots, 16_m$ of the master node and via which of them ports $16_1, \ldots, 16_m$ of the test slave node, a communication between the master node and the test slave node is possible. In a method step $S_{4a}$ there, it is determined whether a communications link can be created to the test slave node by means of an exclusive communication via only one of the m ports $16_1, \ldots, 16_m$ of the master node. If this is possible, then this one port $16_1, \ldots, 16_m$ is stored for the master node. Basically it is possible here for the master node to send out a communications signal. Thereafter, method step $S_{4b}$ is executed (see FIG. 6E). In this method step, method step $S_{4a}$ is repeated until an attempt has been made to create a communications link to the test slave node for all m ports $16_1, \ldots, 16_m$ of the master node exclusively.

Method step $S_{4c}$ can be carried out in one embodiment. In this method step, one of the ports $16_1, \ldots, 16_m$ on the master node is selected to communicate with the test slave node and a communication on the other ports $16_1, \ldots, 16_m$ of the master node is prevented. In addition, method step $S_{4d}$ is executed, in which a communication is prevented to all ports $16_1, \ldots, 16_m$ of the test slave node but one. This one port of the test slave node is stored in case a communications link can be created to the master node via this port $16_1, \ldots, 16_m$. In this context, the corresponding port $16_1, \ldots, 16_m$ of the master node is also stored so that when generating the connection topology, the two ports $16_1, \ldots, 16_m$ of the master node and the test slave node can be considered to be cross-linked.

In a subsequent method step $S_{4e}$, the previous method step $S_{4d}$ is repeated until an attempt has been made to create a communications link to the master node for all other m−1 ports $16_1, \ldots, 16_m$ of the test slave node exclusively. Successful communications links are stored accordingly. Method step $S_{4c}$ is initiated by the master node for example or is performed automatically (e.g. after time has passed) by the test slave node.

Thereafter, method step $S_{4f}$ is performed, in which the previous method steps are repeated for all other ports $16_1, \ldots, 16_m$ of the master node. This applies only for those ports $16_1, \ldots, 16_m$, for which it was determined in method step $S_{4a}$ that a communications link to the test slave node is fundamentally possible.

Instead of method steps $S_{4c}$, $S_{4d}$, $S_{4e}$ and $S_{4f}$, method steps $S_{4a\_1}$ and $S_{4a\_2}$ could also be performed. Method step $S_{4a\_1}$ is executed in method step $S_{4a}$. In this method step, communication is prevented to all but one port $16_1, \ldots, 16_m$ of the test slave node and this one port $16_1, \ldots, 16_m$ is stored for the test slave node in the event that a communications link can be created to the master node via this port. In method step $S_{4a}$, only port $16_1, \ldots, 16_m$ of the master node is active, so that in the event of a successful communications link, a corresponding pair of ports $16_1, \ldots, 16_m$ can be stored. Thereupon, method step $S_{4a\_2}$ is performed, in which method step $S_{4a\_1}$ is repeated until an attempt has been made to create a communications link to the one active switched master node for all additional m−1 ports $16_1, \ldots, 16_m$ of the test slave node exclusively. Method step $S_{4a\_2}$ is initiated by the master node for example or executed independently (e.g. after time has passed) by the test slave node.

By repeating step $S_{4b}$ according to FIG. 6D, another port $16_1, \ldots, 16_m$ of the master node is switched to active, or an attempt is made to create a communications link to the test slave node for the other ports $16_1, \ldots, 16_m$ of the master node exclusively (in other words, in an iterative manner). By repeating the corresponding method steps $S_{4a\_1}$ and $S_{4a\_2}$, all ports or additional ports $16_1, \ldots, 16_m$ are tested on the test slave node. Basically, it could be possible that a plurality of ports $16_1, \ldots, 16_m$ of the master node are connected to one and the same port $16_1, \ldots, 16_m$ of the test slave node. In this case, for every port $16_1, \ldots, 16_m$ of the master node, an attempt is made to determine whether a communications link to every port $16_1, \ldots, 16_m$ of the test slave node can be established.

Each node $15_1, \ldots, 15_n$ may have a different number of ports $16_1, \ldots, 16_m$, but each must have at least one port $16_1, \ldots, 16_m$. The type of communication between two nodes $15_1, \ldots, 15_n$ may differ from the type of communication between two other nodes $15_1, \ldots, 15_n$. Basically, it would also be possible that the type of communication is identical for all nodes $15_1, \ldots, 15_n$.

The test whether a communication between two ports $16_1, \ldots, 16_m$ of various nodes $15_1, \ldots, 15_n$ is possible can be determined by time-outs, for example. If no communication occurs within a certain, definable time span, it can be concluded for these ports $16_1, \ldots, 16_m$ that there is no direct connection between the two ports.

The invention is not restricted to the described embodiments. Within the scope of the invention, all described and/or illustrated features may be arbitrarily combined with one another.

The invention claimed is:

1. A method for topology determination in a mobile communications site comprising n nodes, where n≥3, wherein each node has m ports, where m≥1 and every node is an electrical functional unit; and wherein each one of the n nodes is connected electrically and/or electromagnetically via at least one of its m ports to at least one other of the n nodes via at least one of its m ports for communications purposes, the method comprising:

determining the number n of existing nodes;

designating from the determined n nodes a master node and first and second slave nodes;

selecting the first slave node as a first test slave node and preventing a communication of the other slave node(s);

testing via which of the m ports of the master node and via which of the m ports of the first test slave node a communication between the master node and the first test slave node is possible, and storing these ports;

selecting the second slave node as a second test slave node, and preventing a communication of the other slave node(s);

testing via which of the m ports of the master node and via which of the m ports of the second test slave node a communication between the master node and the second test slave node is possible, and storing these ports;

repeating the selecting and testing for each of the other slave nodes, if any, wherein in selecting, a different slave node is selected in each case as the test slave node; and generating a connection topology for the master node based on the stored ports.

2. The method according to claim 1, wherein in the selecting, the communication of the other slave nodes is prevented only for a predetermined duration of time or until a trigger signal occurs.

3. The method according to claim 1, wherein:

the testing comprises:

determining whether a communications link to the first test slave node can be created by an exclusive communication via only one of the m ports of the master node and storing this one port for the master node in the event that a communications link can be created; and repeating the determining until an attempt was made to create a communications link to the first test slave node for all m ports of the master node.

4. The method according to claim 3, wherein:

the determining also comprises:

preventing communication on all except one port of the first test slave node and storing this one port for the first test slave node, if a communications link can be created to the master node via this port; and repeating the preventing until an attempt was made to create a communications link to the master node for all other m−1 ports of the first test slave node.

5. The method according to claim 3, further including:

determining a port on the master node for communicating with the first test slave node and preventing communication on the other ports of the master node;

preventing a communication to all but one port of the first test slave node and storing this one port for the first test slave node, if a communications link to the master node can be created via said port;

repeating the preventing until an attempt has been made to create a communications link to the master node for all other m−1 ports of the first test slave node.

6. The method according to claim 5, further including:

executing again the establishing and preventing and repeating the preventing for all other ports of the master node for which it was determined in the determining that a communications link to the first test slave node can be created.

7. The method according to claim 1, wherein in the selecting, communication of the other slave nodes is prevented by an interruption in layer 1 or a higher layer at the respective m port of the other slave nodes; and/or in the preventing, preventing communication occurs:
f) at the ports of the first test slave node; and/or
g) the other ports of the master node; by an interruption in layer 1 or a higher layer at the respective m ports.

8. The method according to claim 1, wherein the n nodes comprise at least two different types of electrical functional units from the group of:
base stations;
combiners;
DTMAs;
RET units;
antenna arrangements;
monitoring units.

9. A method for topology determination in a mobile communications site comprising n nodes, where n≥2, or n≥3, or n≥4, wherein each node has m ports, where m≥1 and every node is an electrical functional unit, wherein each one of the n nodes is connected electrically and/or electromagnetically via at least one of its m ports to at least one other of the n nodes via at least one of its m ports for communications purposes, the method comprising:

determining the number of existing nodes;

designating from one of the determined n nodes a master node and the other node as the slave node;

selecting a slave node as a test slave node and preventing a communication of the other slave nodes;

testing via which of the m ports of the master node and via which of the m ports of the test slave node a communication between the master node and the test slave node is possible, and storing these ports;

repeating the selecting and testing for each of the other slave nodes, wherein in selecting a different slave node is selected in each case as the test slave node; and generating a connection topology for the master node, and the method further including:

repeatedly executing:
a) designating;
b) selecting;
c) testing;
d) repeating; and
e) generating;

wherein in the designating, one of the previously designated slave nodes is designated as the new master node, and wherein repeating the execution is executed until at least n−1 nodes have been designated once as the master node.

10. The method according to claim 9, wherein at least one of the n nodes in addition to the m ports also has at least one additional wired or wireless interface and is designed to communicate via this at least one additional interface with other networks or devices, and further including:

adding the at least one additional interface to the connection topology for the at least one of the n nodes.

11. The method according to claim 9, further including:

creating a topology of the mobile communications site using the connection topologies generated in the generating, of the individual nodes, wherein the topology of the mobile communications site indicates to which additional node or which additional nodes each node is connected, for exchanging data.

12. The method according to claim 11, wherein:

in generating a topology, the connection topologies of the individual nodes are transmitted to a node or to a control device, wherein the node or the control device generates the topology of the mobile communications site from the individual connection topologies.

13. The method according to claim 11, further including:

comparing the generated topology with a reference topology; and determining and/or outputting deviations between the generated topology and the reference topology.

14. The method according to claim 12, wherein the mobile communications site also has a communications device, which is designed to transmit data to a higher-level routing and control device, and the method further including:

transmitting the generated topology of the mobile communications site to the higher-level routing and control device; and/or transmitting the determined deviations between the generated topology and the reference topology to the higher-level routing and control device.

15. The method according to claim 1, wherein:
in the determining, an individual rank is assigned to each of the determined nodes; and
in the designating, the node whose rank has the lowest or highest value compared to the ranks of the other nodes, is designated as the master node.

16. The method according to claim 15, wherein the rank of a node stems from:
a serial number;
a device type;
a number of ports;
a MAC address;
an IP address;
an address;
a number;
an arbitrary number;
a device feature; and/or
a temperature value;
or a feature derived from these.

17. The method according to claim 9, wherein:
in the repeated execution, when executing the determining, the already allocated ranks are retained or the previous slave nodes are assigned entirely or partially new ranks.

18. A computer program for use in a mobile communications site comprising n nodes, where n≥3, wherein each node has m ports, where m≥1 and every node is an electrical functional unit; and wherein each one of the n nodes is connected electrically and/or electromagnetically via at least one of its m ports to at least one other of the n nodes via at least one of its m ports for communications purposes, the computer program comprised a non-transitory storage medium comprising program code instructions of the computer program that, when the program code instructions are executed on a computer or a digital signal processor, control the computer or the digital signal processor to perform the following operations:
determine the number n of existing nodes;
designate from the determined n nodes a master node and first and second slave nodes;
select the first slave node as a first test slave node and prevent a communication of the other slave node(s);
test via which of the m ports of the master node and via which of the m ports of the first test slave node a communication between the master node and the first test slave node is possible, and store these ports;
select the second slave node as a second test slave node, and prevent a communication of the other slave node(s);
test via which of the m ports of the master node and via which of the m ports of the second test slave node a communication between the master node and the second test slave node is possible, and store these ports;
repeat the select and test for each of other slave nodes, if any, wherein in selecting a different slave node is selected in each case as the test slave node; and
generate a connection topology for the master node based on the stored ports.

19. A computer program product with program code stored on a non-transitory machine-readable medium so as to perform all steps according to claim 1, when the program is executed on a computer or a digital signal processor.

20. A mobile communications site comprising:
n nodes, where n≥3, wherein every node comprises m ports, where m≥1; and
wherein the mobile communications site is configured for determining the topology according to the following operations:
determining the number n of existing nodes;
designating from the determined n nodes a master node and first and second slave nodes;
selecting the first slave node as a first test slave node and preventing a communication of the other slave node(s);
testing via which of the m ports of the master node and via which of the m ports of the first test slave node a communication between the master node and the first test slave node is possible, and storing these ports;
selecting the second slave node as a second test slave node, and preventing a communication of the other slave node(s);
testing via which of the m ports of the master node and via which of the m ports of the second test slave node a communication between the master node and the second test slave node is possible, and storing these ports;
repeating the selecting and testing for each of other slave nodes, if any, wherein in selecting a different slave node is selected in each case as the test slave node; and
generating a connection topology for the master node based on the stored ports.

* * * * *